(No Model.)

S. W. BREWSTER & L. SHERWOOD.
BOG CUTTER.

No. 255,376. Patented Mar. 21, 1882.

ATTEST-
Walter F. Brewster
George Johnson

INVENTORS-
Samuel W. Brewster
Lyman Sherwood

UNITED STATES PATENT OFFICE.

SAMUEL W. BREWSTER AND LYMAN SHERWOOD, OF SOUTHEAST, NEW YORK; SAID SHERWOOD ASSIGNOR TO SARAH ELIZABETH SHERWOOD.

BOG-CUTTER.

SPECIFICATION forming part of Letters Patent No. 255,376, dated March 21, 1882.

Application filed November 22, 1881. (No model.)

*To all whom it may concern:*

Be it known that we, SAMUEL W. BREWSTER and LYMAN SHERWOOD, of the town of Southeast, county of Putnam, and State of New York, have jointly invented certain new and useful Improvements in Bog-Cutters, of which the following is a full, clear, and exact description, reference being had to the accompanying drawings and to the letters of reference marked thereon.

The object of our invention is to produce a strong, durable, effective, and easily-operating machine or implement for cutting bogs, one which can be produced at little cost, and which is not liable to get out of order under any circumstances of ordinary use. To accomplish this our invention involves certain novel and useful peculiarities of construction and relative arrangements or combinations of parts, all of which will be herein first fully described and then pointed out in the claim.

Figure 1:
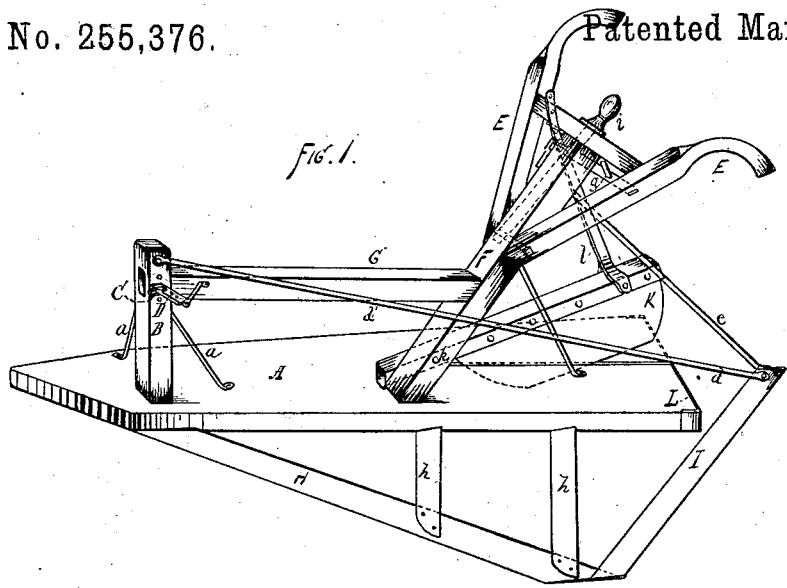
Figure 2:
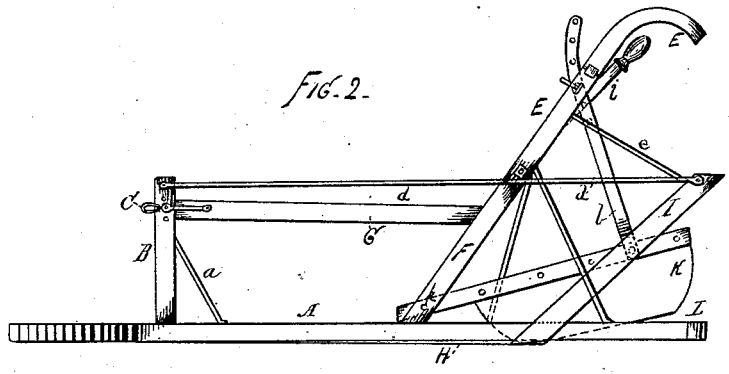
Figure 3:
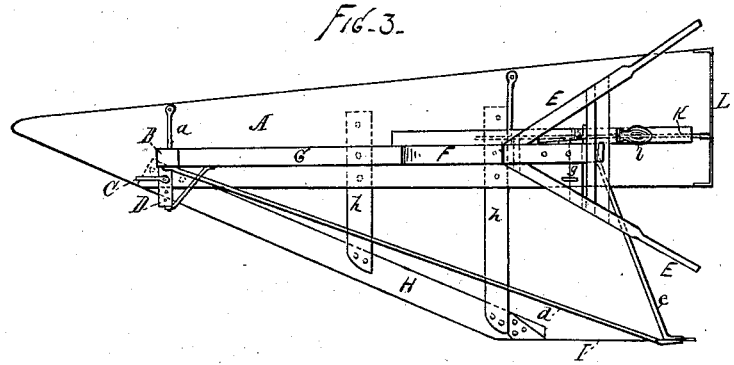

Our improved machine or implement is fully represented in the accompanying drawings, which form part of this specification, wherein Figure 1 is a perspective view, Fig. 2 a side elevation, and Fig. 3 a top or plan view.

In all these figures like letters of reference, wherever they occur, indicate corresponding parts.

A is the bottom or foundation of the cutter upon which the other parts are mounted, and which is intended to move over the surface of the ground. It may of course be made of any desired size and of any proper material; but we prefer to make it about eight feet long and of width in proportion, and for material we find wood to answer all the required purposes.

At a convenient point on the bottom A, and at or near the forward end thereof, is a standard, B, suitably braced, as by rods *a a*.

C is any suitable clevis for attachment of the whiffletree, (not shown,) or for otherwise coupling the draft-animals to the device. The clevis is mounted upon a horizontal bar, D, which bar may be elevated or depressed by inserting it in any one of the holes provided for it in the standard B, and the clevis may be adjusted to or from the standard, the object of all of which is to regulate and adjust the line of draft to correspond with the conditions under which the implement is to be worked.

The handles E E are suitably braced and connected with the bottom by the inclined piece F, which in turn is connected with the draft-post by a suitable beam, G. These parts being made solid and strong, the device is easily handled and controlled in the direction of its movements along the ground.

The horizontal cutter-blade H is united with the bottom A at the region of the forward end of the device, and it will be observed that the edge of the blade H is substantially in line with one side of the point formed on the leading end of the bottom. The design of the bevel-angle at the forward part of the bottom A is that when the team is driven too much to the left it will carry the fore part of the machine off to its proper position. This blade extends rearward a sufficient distance, and is provided with tie-pieces *h h*, bracing it to the bottom. The tie-pieces or arms *h h*, to connect the horizontal cutter-blade H to the bottom of the machine, are made of spring-steel, in order to secure strength and elasticity. That these tie-pieces may not add materially to the draft of the implement they are made flat, and their front edges are sharpened somewhat, not for the purpose of cutting, but to enable them to slide along easily under any material which may fall upon them as the implement moves along.

The vertical cutter I is connected with blade H, extends slightly toward the rear, has its front edge sharpened, and is braced by suitable tie-rods, as *d e*, which hold it in proper position.

With the implement so arranged it is clear that as it is being drawn along any obstruction at the front would tend to swing the rear to one side; and to obviate this, as well as to make the machine do its cutting work properly, we provide a guiding arrangement at the rear under control of the operator.

The rear of the plank or bottom is slitted to permit the passage of the broad blade K, which is hinged, as at *k*, and may be lifted up and lowered by the hand-lever *i*. The hand-lever *i* is pivoted upon a lifting-bar, *l*, the latter having any number of holes for the admission of a holding bolt or pin, *g*. The guide K may be elevated or depressed and held in the required position. When the guide K enters the ground it operates to prevent the sidewise movement of the rear of the machine above alluded to; or, in other words, it holds the cutters to their working position.

If necessary, the operator may stand upon the rear of the bottom A, and thus force the guide to continue in the ground as the implement moves along. On hard ground it will not be necessary to drop the guide so low as upon soft ground.

To prevent splitting or other damage to the rear of the bottom piece, we employ a metal band, as at L, and, if desired, the front or point of the bottom piece may also be protected by a shoe or strap of metal.

The front edge of the horizontal cutting-blade is preferably inclined downwardly a very little, so that it will cut quite close to the ground and have a tendency to enter rather than leave it.

The improved machine being constructed and arranged substantially in accordance with the foregoing explanations, and being drawn over the ground by any suitable power, the horizontal cutting-blade will trim off the bogs or any like irregularities of surface, and, by reason of its inclination to the line of draft, will accomplish its work with comparative ease, affording a shearing-cut. The purpose of the upright blade is to divide the bog in case it be too wide to be cut off by the horizontal blade, and the uncut part may be removed on the second or any subsequent turn about the field with the implement.

In practice the improved machine is found to answer the several purposes or objects of the invention, as previously stated. Its simplicity and durability will recommend it for use in situations where its cutting effects may be advantageous.

Having now fully described our invention, what we claim as new herein, and desire to secure by Letters Patent, is—

1. In a bog-cutter, the combination of the slotted base or bottom A, the adjustable guiding-blade K, and the rearwardly-inclined cutting-blade H, substantially as shown and described.

2. In a bog-cutter, the horizontal and upright cutting-blades mounted upon one side of the bottom piece, the draft-post, the guiding-blade, and the handles, all combined and arranged substantially as shown and described.

3. The herein-described improved bog-cutter, consisting of the bottom piece, the two cutting-blades, the draft-post, the adjustable clevis attachment, the handles, and the adjustable guiding-blade provided with lifting-lever and securing pin or bolt, all arranged to operate substantially as and for the purpose set forth.

In testimony that we claim the foregoing we have hereunto set our hands in the presence of two witnesses.

SAMUEL W. BREWSTER.
LYMAN SHERWOOD.

Witnesses:
WALTER F. BREWSTER,
GEORGE JOHNSON.